(No Model.)

E. THOMSON.
SYSTEM OF ELECTRICAL DISTRIBUTION.

No. 519,076. Patented May 1, 1894.

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

SYSTEM OF ELECTRICAL DISTRIBUTION.

SPECIFICATION forming part of Letters Patent No. 519,076, dated May 1, 1894.

Application filed August 5, 1889. Serial No. 319,830. (No model.)

*To all whom it may concern:*

Be it known that I, ELIHU THOMSON, a citizen of the United States, and a resident of Lynn, in the county of Essex and State of Massachusetts, have invented certain new and useful Improvements in Systems of Electrical Distribution, of which the following is a specification.

My invention relates to those systems of distribution in which electric currents of high potential are led to the points at or near the point of consumption and are there transformed or converted into currents of lower potential for use in producing light, power, heat, &c. By transformers I mean to include any means by which the current on one circuit may be made to produce or generate directly or indirectly current on another circuit, and I therefore include in such term not only those devices which, like induction coils, operate by direct electrical and magnetic induction but also those other devices in which an electric motor in the prime circuit drives a generator that supplies current to the independent circuit for light, power, &c. I also mean to include by such term those devices in which secondary batteries are employed for transforming the high potential current on the main line into a lower potential current on the secondary or independent circuits.

My invention is therefore applicable both to those systems in which alternating currents are employed and to those in which continuous or uni-direction currents are employed on the main circuit.

The object of my invention is to secure on the local or independent or secondary circuit freedom from danger of shock to persons as well as immunity from fire on such circuits due to the accidental existence thereon of the high potential current passing upon the main or feeding circuit and which high potential current may accidentally find its way to the secondary circuit by a leak or abnormal connection.

The object of my invention is, at the same time, to secure accessibility of the transformer or generator while it shall be out of the reach of unskilled or meddlesome persons who may be disposed to examine or tamper with it.

My invention consists in placing the local generator in a cell or vault which shall be securely locked or rendered inaccessible to any but authorized persons, and further consists in leading the main or circuit of high potential to such transformer through conduits out of reach, while the secondary wires or circuits leading to the local are provided with ground wires or contacts.

Figure 1:
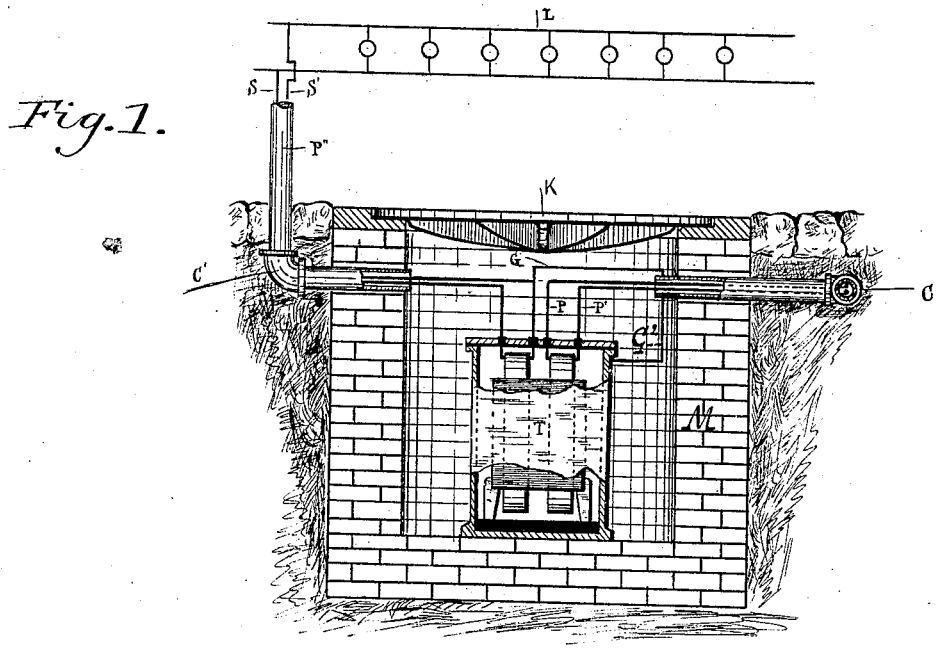
Figure 2:
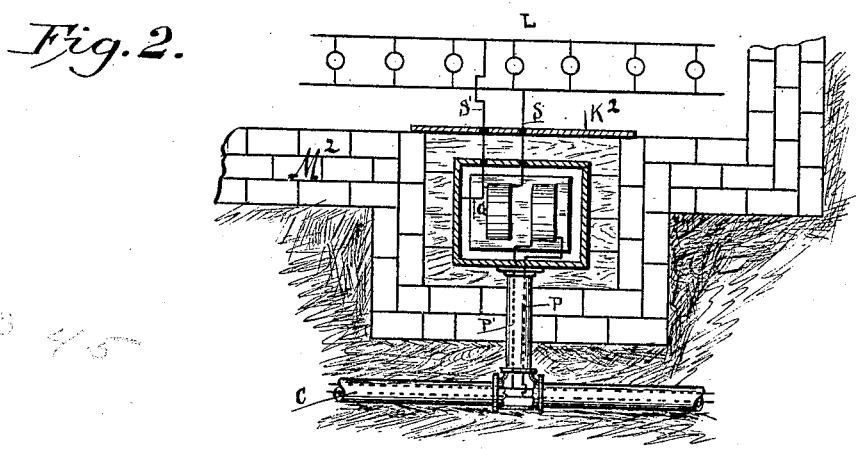

In the accompanying drawings:—Figure 1, shows my invention as carried out in connection with a transformer placed in a cell or vault that may be opened from the street. Fig. 2, illustrates a modification in which the transformer is accessible from the side, as from a cellar. In this figure the walls of the cellar are shown in horizontal section and the transformer box and parts in plan.

In Fig. 1, the transformer appears in elevation and the side walls of the vault or cell in vertical section.

L, indicates a group of lights or other translating devices placed in a building, or other location, and supplied with a low potential or perfectly safe current from the transformer T.

M, indicates the brick-work of the vault or cell placed beneath the surface of the ground and closed by a cover plate K. The transformer placed therein has its secondary wires or connections S, S', leading to the lights L, or other devices carried through a pipe or conduit C', which opens into the vault as indicated and leads from such vault to the point where the wires S, S', debouch therefrom for distribution in the building or other locality.

C, indicates a pipe or conduit through which the main wires carrying the currents of high potential lead by conductors P, P', to the transformer. A ground circuit or connection of little resistance indicated at G, is made from the secondary wires or circuits S, S', and preferably within the vault itself. This ground wire or connection is preferably formed by attachment of a wire or conductor directly to the buried iron or conducting pipe C, or may be otherwise formed as desired. By means of this short wire or conductor the current on the high potential circuit P, P' if such circuit is grounded at a distant point of different potential, may pass directly to earth avoiding by shunting any persons or objects connected to or in contact with the secondary wires or circuits S, S', or parts attached thereto.

In Fig. 2, K², indicates a vertical plate or cover for a cell or vault formed in or as a projection from the cellar wall M², of a building. The primary conductors P, P', connect with the transformer in such vault by passing through a pipe attached to the conduit C, as shown, and connection with the lights L, or other devices in the building is made by the wires S, S', leading through the cover of the vault or in any other suitable manner carried to such devices. Here, as before, suitable ground connection is made from the secondary wires or circuits, one or both, for the purpose before explained. This ground connection may be formed when the casing for the transformer is of conducting material and is in connection with the lateral iron pipe through which conductors P, P', pass by simply running a wire or connection from one of the wires S, S', to such casing.

As shown in Fig. 1, an additional ground connection for safety purposes may be made by wire G², from the casing of the converter or transformer T.

What I claim as my invention is—

In a system of electric distribution comprising high potential mains and low potential secondaries, a vault or chamber beneath the ground, a converter, a metal case therefor placed in said vault, underground pipes through which pass the high potential wires to the primary of the converter, low potential wires passing from the secondary of the converter through protecting pipes, and ground wires connecting the secondary of the converter and the converter case respectively, to a low resistance ground connection.

Signed at Lynn, in the county of Essex and State of Massachusetts, this 1st day of August, A. D. 1889.

ELIHU THOMSON.

Witnesses:
JOHN W. GIBBONEY,
A. L. ROHRER.